Jan. 20, 1970   H. W. DE WITTIE   3,490,619
LOAD LEVELER

Filed Sept. 11, 1968   3 Sheets-Sheet 1

INVENTOR.
H. W. DEWITTIE
BY
Bean & Bean
ATTORNEYS

Jan. 20, 1970   H. W. DE WITTIE   3,490,619
LOAD LEVELER
Filed Sept. 11, 1968   3 Sheets-Sheet 3

INVENTOR.
H. W. DEWITTIE
BY
Bean & Bean
ATTORNEYS

United States Patent Office

3,490,619
Patented Jan. 20, 1970

3,490,619
LOAD LEVELER
H. W. DeWittie, Waverly, Pa., assignor to International Salt Company, Clarks Summit, Pa.
Filed Sept. 11, 1968, Ser. No. 759,077
Int. Cl. B65g 65/32, 53/50; F04d 13/04
U.S. Cl. 214—17      4 Claims

ABSTRACT OF THE DISCLOSURE

A device for loading particulate material such as salt, grain, wood chips, etc., into a bin or other container in such a manner as to more fully utilize the space within the container; and being usable in a corrosive or explosive atmosphere.

BACKGROUND OF THE INVENTION

In the storing and shipping of bulk material such as salt or grain etc., it has been found that considerable space at the top of the container is void of material. This is caused by what is known in the trade as the "angle of repose" of the material which, of course, varies with the particular material. Attempts have been made in the past to fill these voids in containers by including a horizontal component of motion to the material to modify the angle of repose. In some instances, this was attemped by pouring the material onto a stationary conical member, with a view to distributing the material over a greater area. In other disclosures, vanes were added to rotatable cones so that the material would cause the cones to rotate as it was poured into the container, thus assisting in the distribution of the material. Still other systems employ means to mechanically rotate vaned cones with a view to attain even greater material distribution. Such mechanical devices of the prior art, even when equipped with fluid or explosion-proof electric drive motors, invariably generate sufficient heat so as to make hazardous the use of such devices in explosive atmospheres. Also, such prior devices are short-lived in corrosive atmospheres, requiring frequent bearing replacements.

Having in mind the deficiencies of the prior are mentioned above, it is the prime objective of my invention to provide an improved means for distributing granular material within a container such as a silo or railroad car, or the hold of a ship, or the like.

Another object is to provide a safe means for distributing material such as grain or the like; wherever the dust thereof creates a hazardous atmosphere.

Still another object is to provide a bulk material loading and distributing device having infinite speed control, to efficiently handle a wide variety of materials.

A further object is to provide a device as described wherein the moving parts are self-cleaning and/or self-lubricating, which is so necessary for example when the device is to be employed in a corrosive atmosphere, while at the same time eliminating any possibility of contaminating the material being handled.

GENERAL DESCRIPTION OF THE INVENTION

These objectives are attained, by way of example and as shown in the accompanying drawings, wherein one preferred form of the invention is shown to consist of a generally cone-shaped distributor comprising a series of helical shaped blades, rotating at a controlled speed to distribute the granular material in horizontal strati over the entire area of the container being loaded, rather than in a cone-like mound. Compressed air is employed to rotate the distributor by impinging it against a series of turbine blades through one or more fixed nozzles. The entire assembly may be attached to the inlet chute or hopper if desired; or it may of course be permanently installed on the container if preferred. However, the former arrangement is preferred when the device is to be employed in the loading of railroad cars or the like.

Furthermore, it is contemplated that the rotor bearing surfaces be operating on films of air supplied by the same source of compressed air as is used to provide the distributor driving media. This eliminates the possibility of contaminating the material being handled, since no grease or other lubricant is required such as when more conventional bearing arrangements are employed. Also, this feature eliminates the possibility of bearing overheatings, since whenever the assembly is operative, a portion of the compressed air supply automatically passes through the bearing surfaces. Thus, the distributor driving air supply provides a continuous cleaning of the bearings, which is a decided advantage such as when the device is operating in a dusty or corrosive atmosphere such as when loading salt or the like. Also, in the handling of abrasive materials, this flow of clean air reduces bearing wear, whereby "down-time" for bearing replacements is eliminated or at least minimized.

The invention further contemplates novel optional modifications to the basic system. For example, while I have shown the device supported by the top of the container, it can as readily be of such dimensions as to pass through the loading opening, so that it can be lowered therethrough and down into the container. This is a desirable feature whenever it is necessary to distribute different materials in well defined layers. For example, this modification may be useful in pulp mills, as a device to spread layers of wood chips in a pulp digester or the like.

The invention may also be readily used to advantage such as for example in connection with outdoor stockpiling of highway ice control salt, or the like, to distribute bulk material over a wide area and thereby reducing the vertical height of the mound.

Other features and specific objects of the invention will also be apparent from the following specification, illustrating by way of example several possible embodiments of the invention as shown in the accompanying drawings wherein:

THE DRAWING

DETAILED DESCRIPTION

Figure 1:
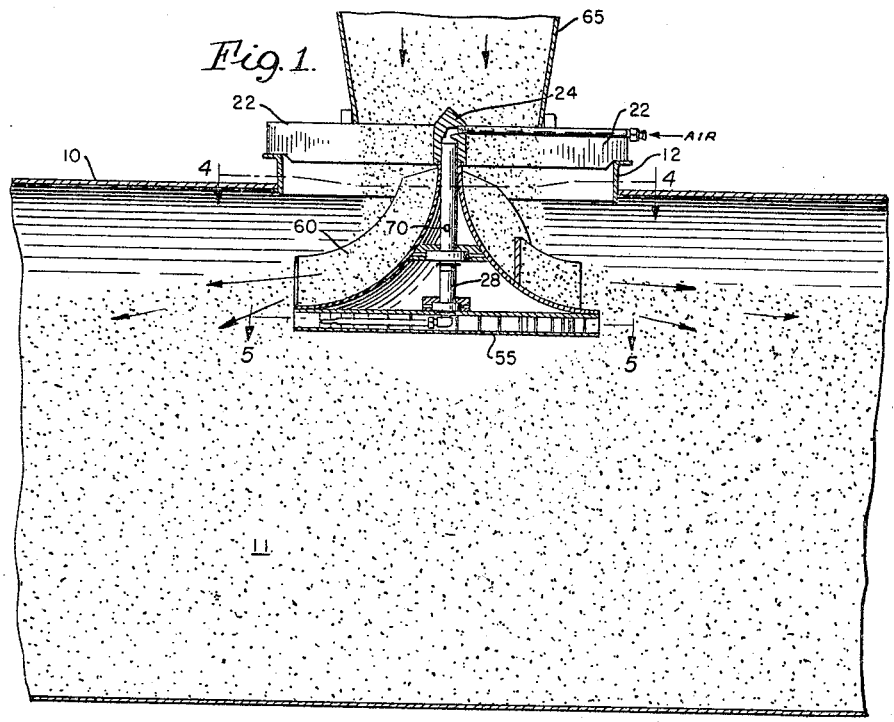
FIG. 1 is a fragmentary vertical section through a "tank car" type container, showing a distributor of the present invention operatively mounted thereon.

As explained hereinabove and as illustrated herewith, the invention may be used in conjunction with any type of container 10, such as a silo, railroad car, or ship's hold, or the like, wherein particulate bulk material 11 is to be stored or shipped or subjected to further processing. The hatch or filler opening for the container is shown as being margined by a rim device 12 extending slightly above the container. The distributor of the invention is shown as being simply set in place on the rim 12 by means of cross arms 22 radiating from a center hub portion 24.

Figure 3:
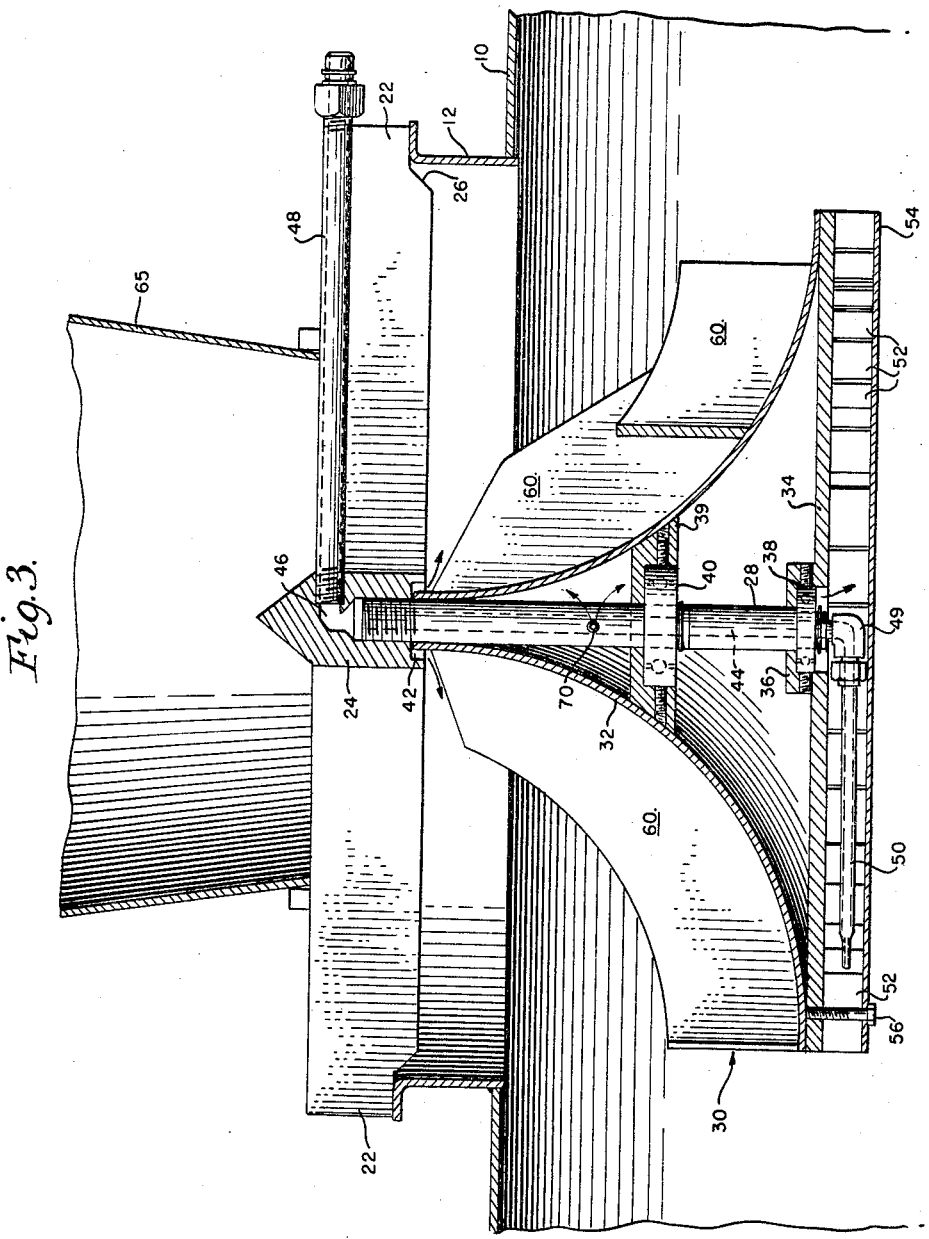
FIG. 3 is an enlarged scale sectional view of the arrangement of FIG. 1.
Figure 4:
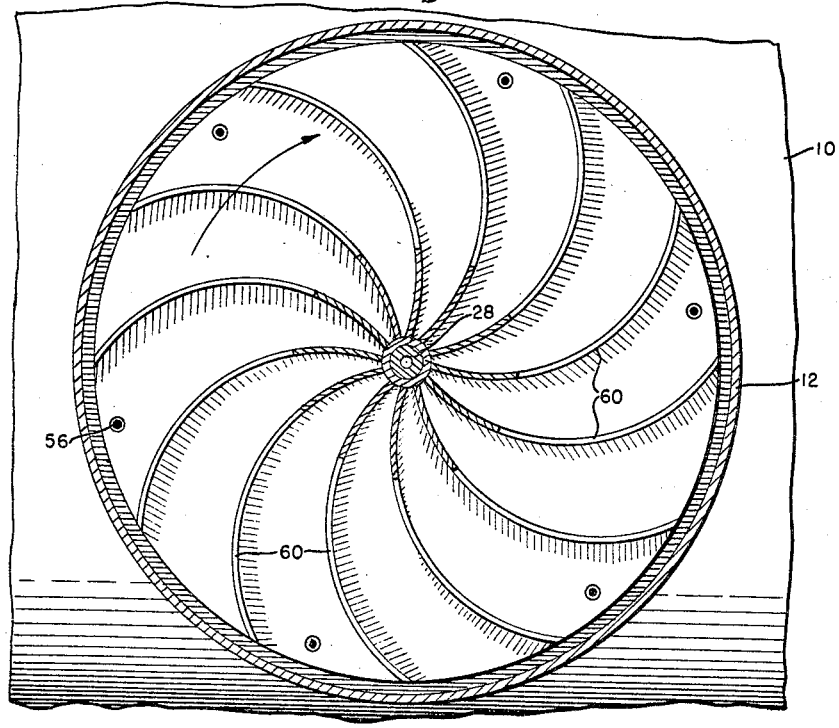
FIG. 4 is a sectional view taken along line 4—4 of FIG. 1.
Figure 5:
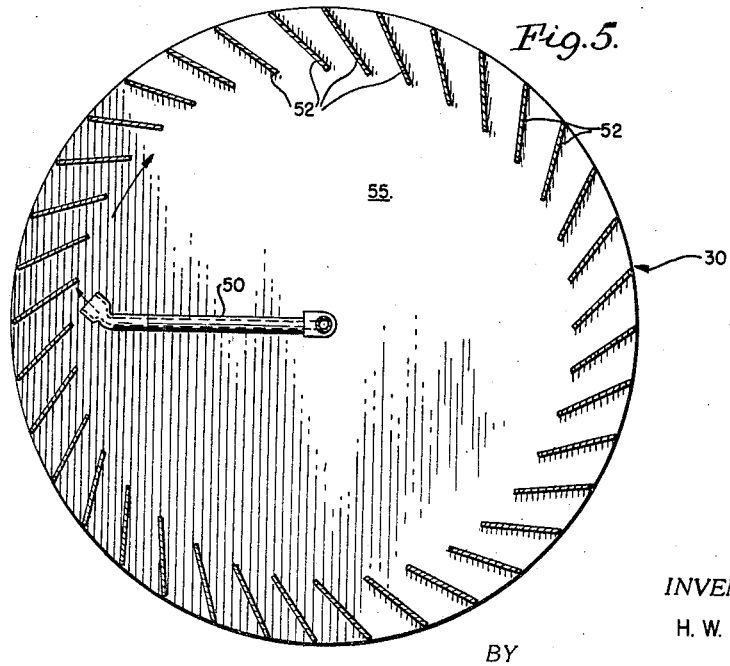
FIG. 5 is an enlarged scale sectional view taken as indicated by line 5—5 of FIG. 1.

As best shown at FIG. 3, the bottom edges of the support arms 22 are preferably beveled at their outer ends as indicated at 26 to permit the device to naturally settle into operative position relative to the hatchway rim, and to be anchored by gravity therein against accidental dislodgements. However, it will be appreciated that the device may be readily lifted away from the hatchway without difficulty when loading operations are completed.

The center hub portion 24 carries in rigidly fixed depending relation therefrom a bearing post 28 upon which is rotatably mounted a rotor as indicated generally at 30. This rotor comprises a concave cone or horn-shaped shell portion 32 which is welded or otherwise fixed about its lower periphery to a circular base plate 34. The hub portion 36 of the base plate may be fitted, if preferred, with a ball bearing or the like as indicated at 38 for rotatably mounting the base plate relative to the bearing post 28. Intermediately of the cone structure 32 it is braced by means of a bracket 39 which, if preferred, carries a second ball bearing device 40; thereby providing dual bearing stabilized rotational support for the cone relative to the bearing post 28. At is upper end the cone structure 32 is dimensioned so as to fit relative to the bearing post 28 so as to be freely rotatable thereabout, and the apex end portion of the cone extends into a counterbore 42 formed in an overhanging bottom portion of the hub member 24.

The bearing post 28 is hollowed as indicated at 44 and the hub 24 is bored and counterbored as indicated at 46 to accommodate in fluid communicating relation a compressed air supply tube 48. Thus, it will be seen that a compressed air supply as fed through the tube 48 (from a hose or the like) will flow through the hub and downwardly through the bearing post and then through an L fitting as indicated at 49 into one or more radially extending jet tubes 50. The jet tube is arranged to discharge an air blast against a series of turbine vanes 52 which stand vertically between the base plate 34 and a bottom cover plate 54; the assembly being maintained as by means of machine screws or the like as indicated at 56. Thus it will be understood that delivery of compressed air through supply tube 48 and through the jet tube 50 will drive the device to rotate about the bearing post 28.

Figure 2:
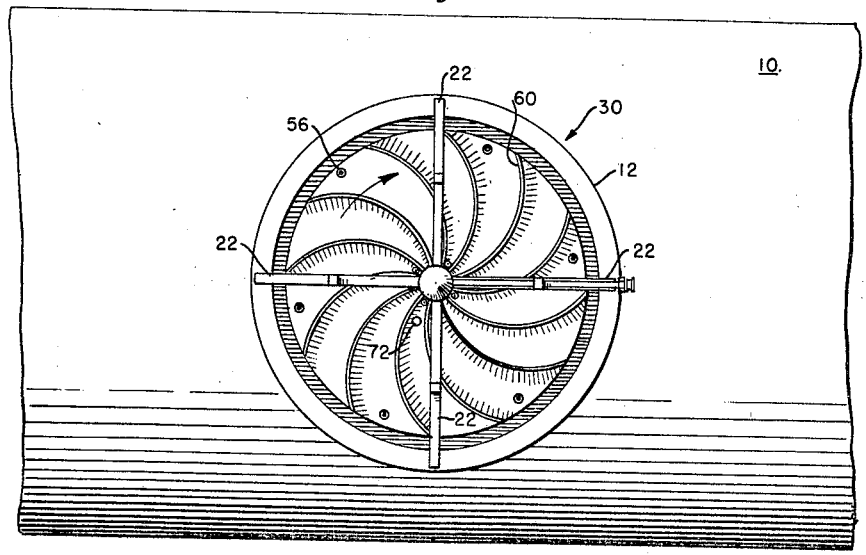
FIG. 2 is a plan view of the device of FIG. 1.

The upwardly directed surfaces of the cone structure are provided with vertically standing blades 60 which are of convolute form in plan view. Thus it will be understood that when the device is set in place as in a container hatchway as illustrated at FIGS. 1-3, it is adapted to receive a downwardly directed gravity flow of the particulate material to be loaded in the container. As the rotor 30 revolves in response to the camming impingement of the material against the blades 60 and operation of the jet 50, the particulate material will simultaneously slide downwardly and radially outwardly along the upper surfaces of the cone structure, while being at the same time centrifugally propelled radially and laterally in all directions. Therefore, as the material load within the container approaches the upper level of the container, the material will be thrown laterally in all directions instead of simply following its usual angle of repose, and will thereby fully occupy the container. A feed hopper as indicated at 65 is preferably provided to guide the inlet feed of material into the device.

It is a feature of the present invention that a small pre-regulated portion of the compressed air supplied by the tube 48 is diverted to wash through and between the relatively moving parts of the distributor bearing assemblies. For example, as illustrated at 70 (FIGS. 1, 3) the bearing post 28 is provided with a metering orifice through a side wall portion thereof intermediately of its vertical length. Thus, whenever the device is operative a small portion of the compressed air supply bleeds through the orifice device 70 into the interior of the cone structure. This air finds egress in part between the apex top end of the cone and the post 28; and in part downwardly, through the bearings 40 and 38, and thence into the space between bottom plates 34 and 54 to atmosphere; as indicated by the directional flow arrows on FIG. 3.

Therefore, it will be appreciated that the air issuing from the orifice 70 provides a thin air film bearing effect between all of the relatively moving parts of the device, while at the same time constantly flushing the bearing surfaces with fresh clean air and exiting at the top and bottom portions of the cone so as to prohibit entrance of dust or other materials into the cone interior and/or the bearing areas. Thus, accumulations of abrasive or corrosive or "seizing" dusts or the like, on the relatively moving parts are prevented in accordance with the objects of the present invention; and the device requires no oil or grease lubrications or the like such as would introduce contaminants into the materials being handled.

It will of course be appreciated that the orifice device 70 may preferably be of screw adjustable form so that the ratio of compressed air diversion to the bearing devices may be readily regulated to suit different operative conditions. A removable plate as indicated at 72 (FIG. 2) may be provided to cover a tool insertion aperture through the cone wall structure, to facilitate adjustments of the orifice, such as may be desired from time to time.

It will of course be appreciated that another feature of the device of the invention resides in the fact that the speed of revolution of the rotor 30 is infinitely variable, simply by appropriate regulation of a valve in the supply hose line, or the like, controlling the compressed air supply to the conduit 48. Hence, the apparatus is readily adjustable to provide optimum results when working with materials of different size, weight, and other flowage characteristics, as well as when working with containers of different shapes and sizes; and in any case a suitable portion of the compressed air supply may be diverted through the bearing and other relatively moving parts to maintain them in optimum operating condition.

What I claim as my invention is:

1. A particulate material spreading device comprising in combination:
   a frame member adapted to be disposed to reside upon a support arranged above the space to be occupied by a controlled accumulation of material,
   a stationary post member depending from said frame member,
   a cone-shaped rotor shell encircling said post member and having a flot bottom plate member closing the bell-shaped opening thereof,
   turbine vane means carried by said bottom plate member, vertically spaced apart bearing means disposed interiorly of said rotor and carried respectively by said shell and said bottom plate, thereby rotatably mounting said rotor on said post member,
   said post member being hollowed throughout a substantial extent thereof to provide an air passageway therethrough,
   compressed air supply means coupled in communication with said air passageway, and
   a jet tube in open communication with said air passageway and arranged to discharge an air blast against said turbine vane means so as to drive said rotor to rotate about said post.

2. A spreading device as set forth in claim 1, wherein said vanes are enclosed by a base plate.

3. A spreading device as set forth in claim 2, wherein said shell is provided with upstanding convolute shaped vanes.

4. A spreading device as set forth in claim 1, wherein said post member also includes an intermediately disposed orifice through a wall portion thereof in communication with the air passageway therein whereby a portion of the compressed air supply is diverted into the interior of said rotor and flushes through the rotor bearing devices and into atmosphere.

References Cited

UNITED STATES PATENTS 2,119,571 6/1938 Coolidge.
3,315,823 4/1967 Rikoff.

ROBERT G. SHERIDAN, Primary Examiner

U.S. Cl. X.R.

239—684, 687

UNITED STATES PATENT OFFICE
CERTIFICATE OF CORRECTION

Patent No. 3,490,619                                January 20, 1970

H. W. DeWittie

It is certified that error appears in the above identified patent and that said Letters Patent are hereby corrected as shown below:

Column 1, line 43, "are" should read -- art --. Column 3, line 34, "is" should read -- its --. Column 4, line 59, "flot" should read -- flat --.

Signed and sealed this 17th day of November 1970.

(SEAL)
Attest:

Edward M. Fletcher, Jr.
Attesting Officer

WILLIAM E. SCHUYLER, J]
Commissioner of Patent